April 14, 1936.  J. EHRHART  2,037,069
BLADE WHEEL PROPELLER
Filed March 17, 1934

INVENTOR
JOSEF EHRHART
BY C. P. Goepel.
ATTORNEY

Patented Apr. 14, 1936

2,037,069

UNITED STATES PATENT OFFICE 2,037,069

BLADE WHEEL PROPELLER

Josef Ehrhart, Heidenheim-on-the-Brenz, Germany, assignor to American Voith Contact Co., Inc., New York, N. Y., a corporation of New York Application March 17, 1934, Serial No. 716,018
In Germany March 18, 1933

14 Claims. (Cl. 170—148)

This invention relates to blade-wheel-propellers and permits to obtain particularly on such propellers with mechanical blade-motion an extremely simple and compact construction.

Blade-wheel-propellers with movable blades are known but they all have material central shafts so that the parts from which the blade motion is derived must be located either in the annular space between shaft and propeller or at the free shaft end.

The blade-wheel-propeller according to this invention, however, has the part holding the blades shaped as a hollow body with inside bearings; this results in various considerable advantages and improvements.

The accompanying drawing shows an embodiment of the invention.

Figure 1:
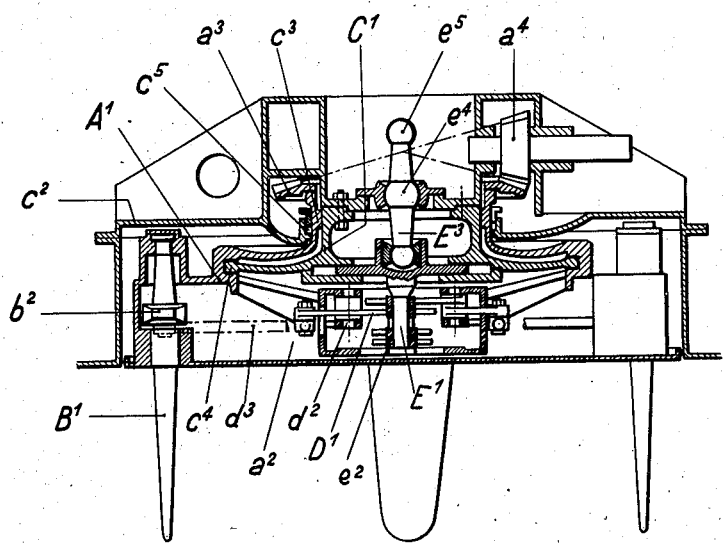
Figure 2:
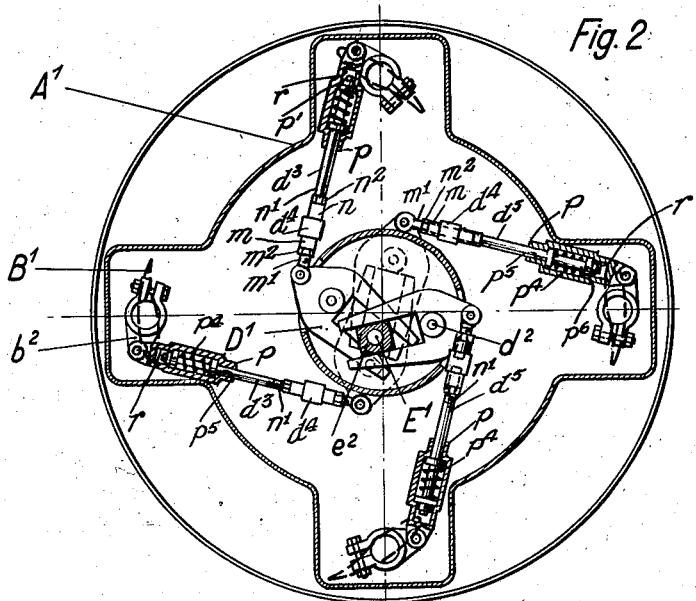

Figure 1 shows a section through the axis;
Figure 2 shows a section in a plane perpendicular to the axis.

The propeller consists essentially of a rotating hollow blade-wheel $A^1$ with inside space $a^2$ and blades $B^1$ fixed at its outer part. In the example shown it is driven by a pair of bevel-gears $a^3$, $a^4$ and is carried on a stationary bearing body $C^1$ arranged in space $a^2$ and forming part of the stationary housing $c^2$. The rotating blade wheel $A^1$ is guided on the bearing body $C^1$ by a journal bearing $c^3$ and a double-sided thrust bearing $c^4$, the diameter of which exceeds the diameter of the journal bearing.

The motion of the blades $B^1$ is derived from slide-cranks $D^1$ which are fastened on the blade-wheel $A^1$ in fulcrum pins $d^2$. Blade-wheel $A^1$ together with the slide-cranks $D^1$ and slide-blocks $e^2$ revolve around a stationary steering-pin $E^1$ which latter can be adjusted in the horizontal plane. According to the setting of steering-pin $E^1$ the slide-cranks $D^1$ oscillate and transmit this motion to the blades $B^1$ by means of connecting rods $d^3$ and levers $b^2$.

For altering the position of steering-pin $E^1$ a lever $E^3$ is provided; it is universally movable in the ball-and-socket articulation $e^4$ and is operated either by hand or mechanically at its free end $e^5$.

The inside $a^2$ of the rotating wheel $A^1$ is sealed by means $c^5$ of known type against the space between the housing $c^2$ and the wheel.

As the stationary bearing body $C^1$ located within the rotating wheel $A^1$ is built hollow and of a shape adapted to that of the rotating wheel $A^1$, it is possible to hold the latter on a journal bearing $c^3$ and on a thrust bearing $c^4$ of larger diameter much more firmly than could be done by any shaft with outside bearings of the usual type; furthermore the central space $a^2$ becomes available as location of a device producing the blade motion.

In this space $a^2$ such a device of known type can be arranged; I have shown a slide-crank-gear, with one slide-crank $D^1$ for each propeller blade $B^1$, the respective slide-crank and propeller blade being connected by rod $d^3$.

Slide-crank-gears for blade-wheel-propellers are known but only in the form of a slide-crank being placed directly on the blade trunnions. They present the great inconvenience that the whole gear is rigid, therefore, under undue resistance of the blade against its motion, breakage or damage to the mechanism can occur.

For a central driving arrangement with connecting rods $d^3$ the latter can be made resilient in longitudinal direction; then, encountering any undue resistance, the blade may instantaneously or constantly reduce or give up its relative motion without damage to the mechanism and without hindering the remaining blades from their own motion. These rods $d^3$ are provided with means whereby they have a certain resiliency and also an adjustability in longitudinal direction. One form of accomplishing this is shown in Fig. 2 in which the rods $d^3$ are formed of separate parts, the part $m$ being hinged to the slide crank $D^1$ and is in alignment with another part $n$ having its end spaced from the end of the part $m$ of the rod. These parts $m$ and $n$ are also screw-threaded as shown in $m'$ and $n'$, thread $m'$ being a right hand thread and thread $n'$ a left hand thread. The two parts $m$ and $n$ are coupled together by a suitable turn buckle $d^4$ which latter is fixed in its position by lock nuts $m^2$ and $n^2$. By this arrangement, the rod $d^3$ may be longitudinally adjusted. In order to provide a resilient action, the rod $d^3$ extends into the casing $p$ and the rod $d^3$ has a collar $p'$ fixed to its end. The collar $p'$ sets against a washer $p^2$ and between this washer $p^2$ and another washer $p^3$, a precompressed spring $p^4$ is provided. The spring in cooperation with washers $p^2$ and $p^3$ and shoulders $p^6$ and $p^5$ of the housing fixes the position of rod $d^3$ relative to the housing $p$ as long as the force transmitted by rod $d^3$ does not exceed the precompression of the spring. If an excessive force is applied, spring $p^4$ will be further compressed, either against washer $p^2$ or against washer $p^3$, depending on the direction in which rod $d^3$ moves. Thus, rod $d^3$ has a resiliency.

In Fig. 2, one of the rods has been provided with adjustable and resilient means and as shown is only an example of what may be used, no claim being made to novelty in respect to actual means themselves, as any other suitable resilient or adjustable means may be employed.

The arrangement of rods $d^3$ and levers $b^2$ between slide-cranks $D^1$ and blades $B^1$ allows furthermore of altering the respective position of the blades $B^1$ to the slide-cranks $D^1$ by varying either the length of the rods $d^3$ or the position of lever $b^2$ on the blade trunnion.

The construction according to the present invention allows for an empty space $a^2$ which conventional designs need for the shaft; in this space it is possible to place the controlling element for the blade motion. This element is advantageously built as a lever $E^3$ universally movable and located predominantly in the propeller axis. Thus, by means of only one very simple element $E^3$, the steering center can be displaced at will in all directions of the plane.

In propellers of the usual type a separate tank with interconnecting pipe-lines is necessary for the oil required for lubricating purposes and for operation auxiliaries for the displacement of the steering center. According to my invention the inside $a^2$ of the rotating wheel $A^1$ is used directly as oil tank. Thus the entire machine as well as lubrication itself is rendered more simple, especially as most of the moving parts are located in this space $a^2$, that is to say, in the oil tank itself.

It is of importance to protect the oil against the entrance of water. According to the present invention an effective protection is obtained by sealing the rotating wheel $A^1$ at its collar-shaped part at $c^5$ by a seal of known type, so that even under slight leakage the water can be carried off from the collar and cannot get into the oil contained in space $a^2$.

I claim:—

1. Blade-wheel-propeller, characterized by the fact that the rotating part holding the blades is a hollow body carried by bearings on its inside.

2. Blade-wheel-propeller according to claim 1, characterized by the fact that the bearings comprise only one journal bearing and one double-sided thrust bearing of larger diameter than the former.

3. Blade-wheel-propeller according to claim 1, characterized by the fact, that the bearings are integral and form a hollow body of a shape substantially adapted to the shape of the rotating part.

4. Blade-wheel-propeller according to claim 1, characterized by the fact, that the bearings form a central hollow chamber which is used for housing the parts from which the blade-motion is derived and controlled.

5. A blade wheel propeller, comprising a hollow body, a plurality of blades, a support for said plurality of blades having a driven mechanism, a driving mechanism for operating the driven mechanism on said support, said driven mechanism and driving mechanism being disposed off center of the hollow body, means centrally located in the hollow body for shifting the position of the blades, and means located centrally of the hollow body for changing the angular position of the blades.

6. A blade wheel propeller, comprising a hollow body, a plurality of blades, a support for said plurality of blades having a driven mechanism, a driving mechanism for operating the driven mechanism on said support, said driven mechanism and driving mechanism being disposed off center of the hollow body, means centrally located in the hollow body for shifting the position of the blades, and means located centrally of the hollow body for changing the angular position of the blades, said last named means including a universally movable lever.

7. Blade wheel propeller having blades and means for rotating the same comprising, a hollow body for holding the blades, bearings for carrying said hollow body arranged on the inside thereof, a central axial tubular member in said hollow body, a steering center means disposed in said tubular member, slide cranks operated by said steering center means, and rods disposed between the slide cranks and blades, whereby the blades may be varied in their positions by the centrally disposed steering center means.

8. Blade wheel propeller having blades and means for rotating the same, comprising a hollow body for holding the blades, bearings for carrying said hollow body arranged on the inside thereof, a central axial tubular member in said hollow body, a steering center means disposed in said tubular member, slide cranks operated by said steering center means, and longitudinally resilient rods disposed between the slide cranks and blades, whereby the blades may be varied in their positions by the centrally disposed steering center means.

9. Blade wheel propeller having blades and means for rotating the same, comprising a hollow body for holding the blades, bearings for carrying said hollow body arranged on the inside thereof, a central axial tubular member in said hollow body, a steering center means disposed in said tubular member, slide cranks operated by said steering center means, and longitudinally adjustable rods disposed between the slide cranks and blades, whereby the blades may be varied in their positions by the centrally disposed steering center means.

10. Blade wheel propeller having blades and means for rotating the same, comprising a hollow body for holding the blades, bearings for carrying said hollow body arranged on the inside thereof, a central axial tubular member in said hollow body, a steering center means disposed in said tubular member, slide cranks operated by said steering center means, rods disposed between the slide cranks and blades, whereby the blades may be varied in their positions by the centrally disposed steering center means, and means offset from the axial center line of the hollow body for rotating said hollow body with its blades.

11. A blade wheel propeller comprising a tubular member arranged centrally thereof, a hollow body, blades disposed in said hollow body, means for moving the hollow body disposed exteriorly of the central tubular member, and mechanism for adjusting the position of the blades disposed within said hollow body and accessible through said central tubular member.

12. A blade wheel propeller comprising a tubular member arranged centrally thereof, a hollow body, blades disposed in said hollow body and supported thereby, means for rotating said hollow body with said blades, said means being disposed off center of said central tubular member, a steering center means supported by said hollow body having parts thereof operative in said central tubular member, and other parts operative in said hollow body, and rods connecting said steering center means with said blades to vary the position of the blades during their rotative movement.

13. A blade wheel propeller, comprising a plurality of blades, means for rotating the same, and means for shifting the position of said blades during their rotation, said last-named means being centrally disposed of the plurality of blades and laterally disposed of the axis of the propeller.

14. A blade wheel propeller, comprising a hollow body, a gearing arranged at right angles to the axis of the propeller and connected with said hollow body member, a driving gear meshing with said first-mentioned gear and said driving gear having its axis at right angles to the axis of the propeller, a steering center mechanism disposed centrally of the first-mentioned gear for varying the position of the blades during their rotative movement, and rods connecting the steering center mechanism with the blades.

JOSEF EHRHART.